Oct. 1, 1940.  W. L. KAUFFMAN, 2D  2,216,397
WRINGER
Filed May 11, 1938
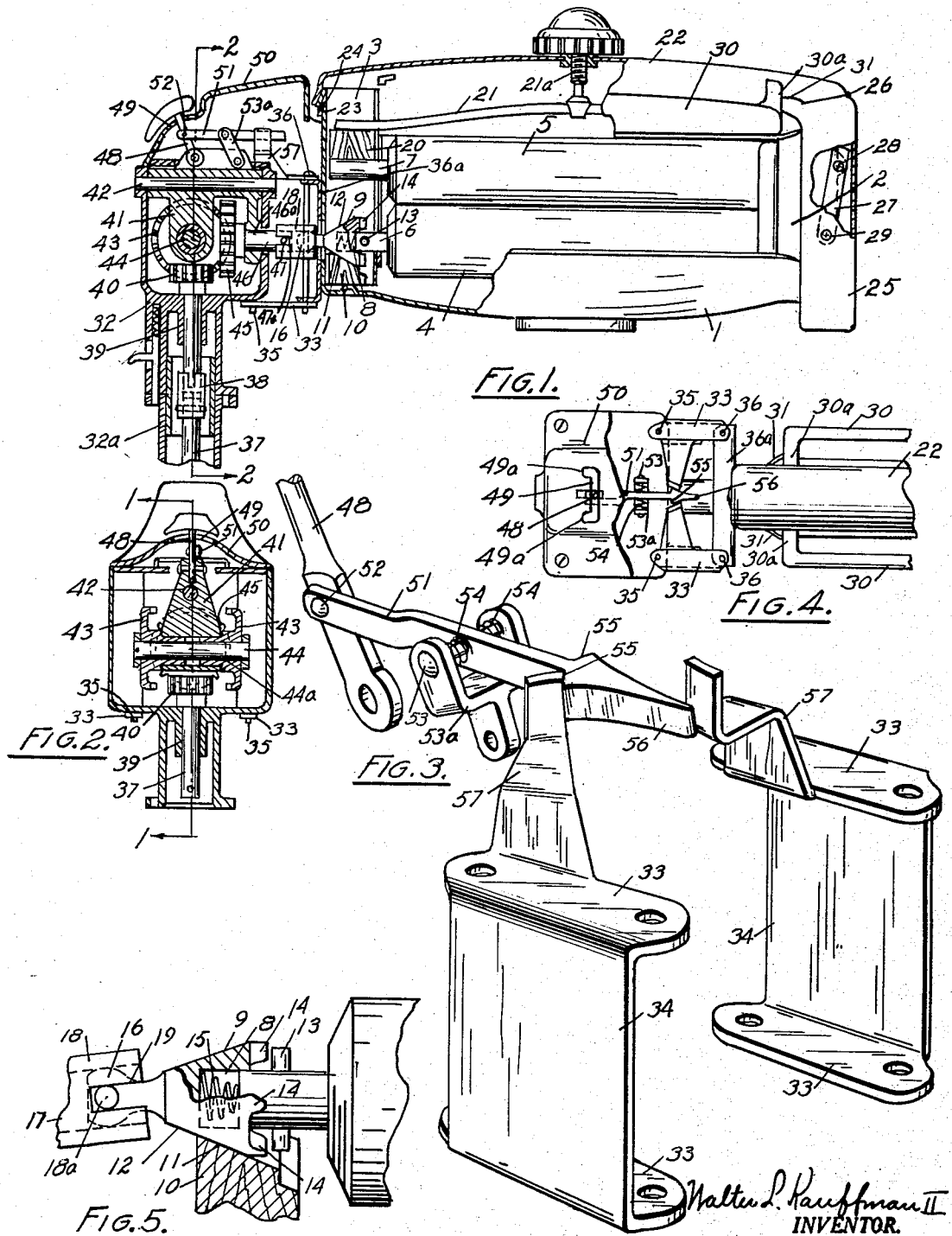

Patented Oct. 1, 1940

2,216,397

UNITED STATES PATENT OFFICE 2,216,397

WRINGER

Walter L. Kauffman, II, Erie, Pa., assignor to Lovell Manufacturing Company, Erie, Pa., a corporation of Pennsylvania Application May 11, 1938, Serial No. 207,333

10 Claims. (Cl. 68—269)

Power wringers have been provided with means for disengaging the driving mechanism in order to provide a safety mechanism against continued drawing in of an operator caught in the rolls. Devices have been made which release the driving connection through a swinging of the wringer so that through the instinctive pull of an operator caught, the wringer is stopped.

Wringers have also been provided with means for releasing the pressure on the rolls as a safety device. The present invention is designed to improve these features and to improve the gear mechanism through which the driving connection is controlled. Further features and details of the invention will appear from the specification and claims.

A preferred embodiment of the invention is illustrated in the accompanying drawing as follows:

Fig. 1 shows an elevation of a wringer, parts of the wringer and driving mechanism being in section.

Fig. 2 a section on line 2—2 in Fig. 1.

Fig. 3 a perspective view of a latching and releasing mechanism controlling the gear mechanism.

Fig. 4 a plan view of the driving end of the wringer, partly broken away to better show construction.

Fig. 5 an enlarged view partly in section of a means for stopping the rolls upon the release of pressure.

1 marks the base of the wringer frame, 2 the stile opposite the driving mechanism, 3 the stile adjacent to the driving mechanism, 4 and 5 the lower and upper rolls respectively, 6 the drive shaft to the lower roll, and 7 the drive shaft to the upper roll. These parts are or may be of ordinary construction. The shaft 6 is journaled in an opening 8 in a clutch element 9. The clutch element operates on a bearing block 10, the block having a tapered seat 11, and the clutch element a tapered surface 12. The shaft is provided with a clutch pin 13 which is adapted to engage jaws 14 on the end of the element. A spring 15 tends to disengage the clutch by forcing the element out of engagement with the pin. The rear end of the element has a ball head 16 which extends into an opening 17 in a tube 18 forming a portion of a universal connection for the drive. A pin 18a extends from the ball 16 into a slot 19 in the end of the tube 18. The slot permits the endwise movement of the element 9 without disengagement. When pressure is placed on the wringer rolls the inclined surfaces acting as cams force the clutch element into engagement with the clutch pin, thus putting this driving connection into engagement. When the pressure is released the spring 15 moves the element out of engagement thus releasing the driving connection of the wringer. This manner of disengaging the driving mechanism forms the subject matter of an application 736,007 filed July 19, 1934.

Sliding bearing blocks 20 are arranged in the stiles and operate on the shaft 7. Pressure spring 21 rests on the bearing blocks 20 and is adjusted by screw 21a in the top bar 22. The top bar is of channel form with downwardly extending ends, the driving end having a shoulder 23 formed therein engaging a shoulder 24 on the stile. The opposite end of the top bar is secured by resetting and releasing lever mechanism. A lever 25 is hinged at 26 on the end of the top bar. Preferably it is of channel form overlapping the side stile. A link 27 is pivoted at 28 on the side stile and at 29 on the lever 25. The lever and link 27 form a toggle by means of which the top bar may be drawn to set position. The pivots 29, 28 and 26 are preferably slightly out of line so as to give the parts a stable relation when the lever is in set position. A trip bar 30 extends across the front of the top bar and is provided with arms 30a which extend into the top bar, these arms forming a pivotal mounting for the trip bar on the top bar. The lever 25 has arms 31 which extend under the arms 30a of the trip bar so that upon an operation or pull on the trip bar the arms 31 are forced downwardly thus swinging the lever 25 outwardly bringing the line of pivots to an unstable position and the further movement of the lever releases the top bar. This toggle resetting mechanism and release device forms the subject matter of an application #131,326 filed March 17, 1937.

The wringer is carried on a mounting 32 which is swiveled on a post 32a. A swinging connection is provided between the mounting 32 and the wringer. This includes two pairs of links 33 each pair of links being connected by plate 34. The links are pivotally secured at 36 to a plate 36a on the wringer frame and by pivot pins 35 to the mounting 32. With this connection the wringer may be forced forward and back with a parallelling movement and is equally sensitive from end to end. A parallelling support of this type is shown in a previous application by me #196,023 dated March 15, 1938. A drive shaft 37 extends upwardly through the posts 32a in the mounting 32. The shaft is provided with a detachable coupling 38 and extends through a bearing 39.

A driving gear 40 is mounted on the upper end of the shaft 37. A gear frame 41 is swingingly mounted on a pin 42 at the upper end of the mounting 32. Reversing gears 43 are journaled on a shaft 44 and carried in an opening 44a in the swinging frame. The gears 43 are so spaced as to clear the driving gear 40 when in a neutral or central position. A roll shaft gear 45 meshes both reversing gears. The gear 45 is fixed on a shaft 46 arranged in a bearing 46a. The shaft 46 has a pin 47 which extends into a slot 47a in the end of the tube 18, the tube 18 in its connections making a flexible coupling for the driving shaft of the wringer.

A manual control lever 48 is pivotally secured on the frame 41, the pivot being crosswise of the frame 41 compels the swinging of the frame 41 with the lever 48. The lever extends through a U-slot 49 in the top of a wringer case 50. The transverse portion of the slot 49 leads into the longitudinally extending portions 49a. Through this mechanism the reversing gears may be thrown into and out of engagement and may be locked in engagement with either direction of drive by the engagement of the lever 48 with the walls of the slot extensions 49a.

In order that the driving mechanism may be disengaged by movement of the wringer the following mechanism is provided: A latch bar 51 is pivotally mounted at 52 on the lever 48. The latch bar is slidingly mounted on a pivot pin 53 carried by a rock arm 53a pivotally mounted on the gear frame 41. Springs 54 are arranged on the pin 53 at each side of the latch bar 51 and tend to hold this bar in a neutral position. The inner end of the bar has shoulders 55 from which extends a guide 56. Arms 57 extend from the links 33 and with the wringer in a central position are located at the sides of the guide 56 as shown in Fig. 4. When the wringer is moved on the links 33 to an operative position the arms 57 at one side of the wringer are moved toward the rear and the arms at the opposite side of the wringer forwardly. If the lever 48 has been moved into an extension 49a the swinging of the wringer with the consequent movement of one of the arms 57 moves this arm back of the shoulder 55, the latch bar 51 yielding to permit the side movement of the latch bar so that the arm 57 may clear the shoulder. With the wringer in this set position the wringer may be operated, but should the operator be caught and pull the wringer toward her the swing of the arm 57 incident to the swinging of the links 34 draws the latch bar inwardly and with it the lever 48. This moves the lever 48 out of the extension 49a and the gear frame 41 swings to a neutral position, this movement being partly in response to gravity but also in response to the gear thrust between the reversing gear in engagement with the drive gear 40. It will be seen, therefore, that the driving mechanism may be set through the action of the control lever 48. The wringer, if pushed to operative position sets the control mechanism so that it may be released either through the lever 48 or by the pull on the wringer. The pressure on the wringer may be relieved by a movement of the trip bar and the relief of pressure releases the driving connection through the element 9. After the pressure is released with the up movement of the top bar the top bar and pressure may be reset by reengaging the shoulders 23 and 24 and swinging the toggle into position.

In the operation of the device, the lever 48 is moved to one of the extensions 49a in the U-shaped slot 49. The wringer is moved forward, thus swinging the links carrying with them the arms 57. One of the arms is moved outwardly and the other inwardly as the links swing. The arm 57 which moves outwardly carries that arm back of the shoulder 55, thus yieldingly holding the wringer in the forward or operative position. Should the operator get caught between the rolls and pull on the wringer, this swings the links and the arm 57 operating on the shoulder 55 carries the member 52 through the engagement of the shoulder far enough to carry the lever 48 out of the extension 49a. The frame 41 then swings to neutral position, both through the action of gravity and the thrust of the gear and as this frame 41 swings to its neutral or central position, the reversing gears are both carried out of mesh with the drive gear and consequently the wringer is stopped.

What I claim as new is:

1. In a wringer having a frame, rolls mounted in the frame, a mounting support for the frame; and a swinging connection for the frame with the mounting support, the combination with the frame, rolls, mounting support, and swinging connection of a reversing gear mechanism carried with the wringer frame comprising a roll gear in driven connection with the opposed reversing gears mounted at right angles to the roll gear and continuously meshing with the roll gear; a driving gear between the reversing gears and having clearance in neutral position from both reversing gears; and means moving the reversing gears while maintaining the mesh relation with the roll gear into and out of mesh with the driving gear for stopping and reversing the rolls.

2. In a wringer having a frame, rolls mounted in the frame, a mounting support for the frame; and a swinging connection for the frame with the mounting support, the combination with the frame, rolls, mounting support, and swinging connection of a reversing gear mechanism carried with the wringer frame comprising a roll gear in driven connection with opposed reversing gears mounted at right angles to the roll gear and continuously meshing with the roll gear; a driving gear mounted between the reversing gears and having clearance in neutral position from both reversing gears; means moving the reversing gears while maintaining the mesh relation with the roll gear into and out of mesh with the driving gear; and devices actuated by the movement of the wringer for controlling said means.

3. In a wringer having a frame, rolls mounted in the frame, a mounting support for the frame; and a swinging connection for the frame with the mounting support, the combination with the frame, rolls, mounting support, and swinging connection of a reversing gear mechanism carried with the wringer frame comprising a roll gear in driven connection with opposed reversing gears mounted at right angles to the roll gear and continuously meshing with the roll gear; a driving gear mounted between the reversing gears and having clearance in neutral position from both reversing gears; and means throwing the reversing gears into and out of mesh with the drive gear through devices operable manually and by movement of the frame for stopping and reversing the rolls.

4. In a wringer having a frame, rolls mounted in the frame, a mounting support for the frame; and a swinging connection for the frame comprising parallel links connecting the mounting support and wringer and permitting a parallelling movement of the wringer; the combination with the frame, rolls, mounting support and swinging connection of a reversing gear mechanism carried with the wringer frame comprising a roll gear in driven connection with opposed reversing gears mounted at right angles to the roll gear and continuously meshing with the roll gear; a driving gear mounted between the reversing gears and having clearance in neutral position from both reversing gears; means moving the reversing gear into and out of mesh with the driving gears; and devices actuated by the movement of the frame controlling said means for stopping and reversing the rolls.

5. In a wringer having a frame, rolls mounted in the frame, a mounting support for the frame, and a swinging connection for the frame with the mounting support; the combination with the frame, rolls, mounting support, and swinging connection of a reversing gear mechanism comprising a gear frame movably mounted carried with the wringer frame; a roll gear journaled in the frame and connected in a driving relation with a roll; reversing gears journaled in the frame and continuously meshing with the roll gear; a drive gear journaled in the head mounted between the reversing gears; and devices for moving the frame and with it the reversing gears into and out of mesh with the driving gear to stop and reverse the rolls.

6. In a wringer having a frame, rolls mounted in the frame, a mounting support for the frame, and a swinging connection for the frame with the mounting support; the combination with the frame, rolls, mounting support, and swinging connection of a reversing gear mechanism comprising a gear frame movably mounted carried with the wringer frame; a roll gear journaled in the frame and connected in a driving relation with a roll; reversing gears journaled in the frame and continuously meshing with the roll gear; a drive gear journaled in the head mounted between the reversing gears; and devices comprising a lever for moving the frame and with it the reversing gears into and out of mesh with the drive gear and a U slot for locking the lever.

7. In a wringer having a frame, rolls mounted in the frame, a mounting support for the frame, and a swinging connection for the frame with the mounting support; the combination with the frame, rolls, mounting support, and swinging connection of a reversing gear mechanism comprising a gear frame swingingly mounted carried with the wringer frame; a roll gear journaled in the frame and connected in a driving relation with a roll; reversing gears journaled in the frame and continuously meshing with the roll gear; a drive gear journaled in the head mounted between the reversing gears; and devices comprising a lever for moving the frame to move the reversing gears into and out of mesh with the drive gear and a U slot for locking the lever.

8. In a wringer having a frame, rolls mounted in the frame, a mounting support for the frame, and a swinging connection for the frame with the mounting support; the combination with the frame, rolls, mounting support, and swinging connection of a reversing gear mechanism comprising a gear frame movably mounted carried with the wringer frame; a roll gear journaled in the frame and connected in a driving relation with a roll; reversing gears journaled in the frame and continuously meshing with the roll gear; a drive gear journaled in the head and mounted between the reversing gears; devices for moving the frame to move the reversing gears into and out of mesh with the drive gear; and a latch bar secured to the devices.

9. In a wringer having a frame, rolls mounted in the frame, a mounting support for the frame, and a swinging connection for the frame with the mounting support; the combination with the frame, rolls, mounting support, and swinging connection of a reversing gear mechanism comprising a gear frame movably mounted carried with the wringer frame; a roll gear journaled in the frame and connected in a driving relation with a roll; reversing gears journaled in the frame and continuously meshing with the roll gear; a drive gear journaled in the head and mounted between the reversing gears; devices for moving the frame to move the reversing gears into and out of mesh with the drive gear; and a latch mechanism responsive to movement of the wringer controlling said devices.

10. In a wringer having a wringer frame, rolls mounted in the frame, a mounting support for the frame, and a swinging connection for the frame with the mounting support comprising parallel links; the combination with the frame, rolls, mounting support, and swinging connection of a reversing gear mechanism carried with the wringer frame comprising a movable frame; a roll gear journaled in the frame and arranged in driving connection with a roll; reversing gears journeled in the frame and meshing with the roll gear; a drive gear between the reversing gears and having clearance in neutral position between the gears; devices moving the gear frame for controlling the gears; a latch mechanism secured to the devices; arms on the links controlling the latch mechanism to release the driving connection with a movement of the wringer.

WALTER L. KAUFFMAN, II.